United States Patent [19]

Gulko

[11] 4,012,911
[45] Mar. 22, 1977

[54] ENGINE POWERED BY LOW BOILING LIQUID

[76] Inventor: Arnold G. Gulko, 1835 Arcola Ave., Silver Spring, Md. 20902

[22] Filed: Mar. 23, 1976

[21] Appl. No.: 669,614

[52] U.S. Cl. .................................. 60/531; 60/671; 60/641; 60/675
[51] Int. Cl.² ......................................... F03G 3/02
[58] Field of Search ............ 60/530, 531, 651, 671, 60/675, 639, 640

[56] References Cited
UNITED STATES PATENTS

| 250,265 | 11/1881 | Landis | 60/675 |
|---|---|---|---|
| 3,509,716 | 5/1970 | Avery | 60/531 |
| 3,778,021 | 12/1973 | Alexander | 60/531 X |
| 3,941,030 | 3/1976 | Massung | 60/675 X |

*Primary Examiner*—Allen M. Ostrager

[57] ABSTRACT

An engine powered by low boiling liquid and adapted to operate upon partial immersion in a heated liquid, which may be solar heated, is provided by a circular train of tubular compartments in which adjacent compartments are sealed to interconnectors and the train is tied to a central axle so that rotation of the train will rotate the axle. The interconnectors have an opening and a tube extending forwardly into the leading compartment, and one way valves permit rearward movement through the tube while preventing forward movement through the tube, and this allows liquid in the bottom compartment to be pumped rearwardly to a descending compartment to power the engine while liquid in an ascending compartment drains rearwardly to minimize the drag on the engine.

7 Claims, 3 Drawing Figures

U.S. Patent   Mar. 22, 1977   4,012,911
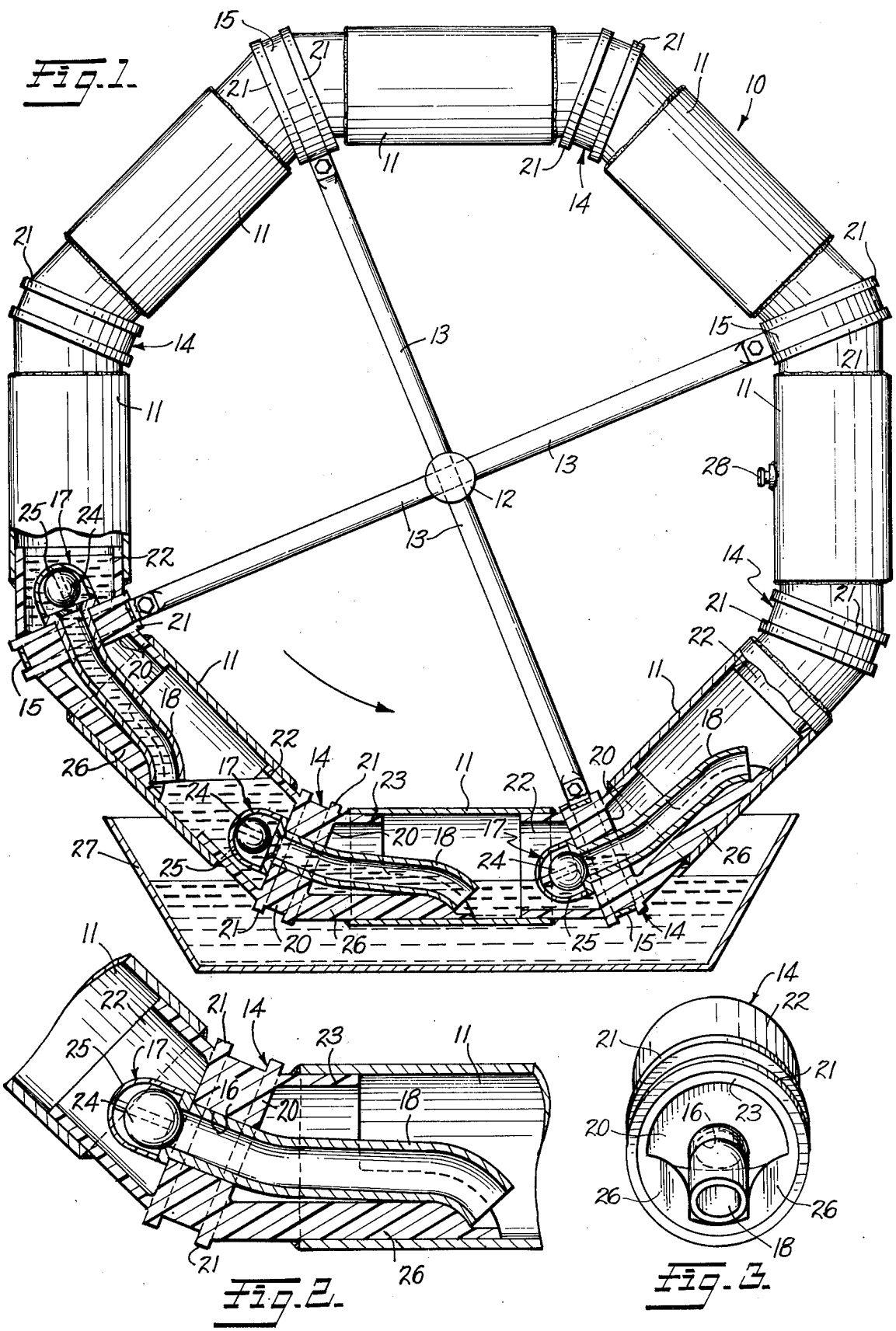

ENGINE POWERED BY LOW BOILING LIQUID

The present invention relates to slow rotating engines which operate using the heat contained in low temperature heated liquids to boil a low boiling liquid and thereby pump it to an elevated position. These engines are particularly adapted to utilize the energy contained in solar heated aqueous liquids.

Engines of the type under consideration are known, but in these a low boiling liquid is forced from a lowermost compartment directly to an uppermost compartment, but the transfer is incomplete, so some of the liquid remains in the lowermost compartment where it acts as a counterweight reducing the efficiency of the engine. Also, the engine is forced to operate at minimal speed to permit adequate opportunity for the liquid in the lowermost compartment to be heated to generate enough pressure to effect the desired transfer. Moreover, the fact of transfer raises the pressure in the uppermost compartment, and this hampers the desired pumping action.

In this invention, the engine is constituted by a circular train of tubular compartments which are interconnected by means of tubes which extend from the forward end of each trailing compartment into the central portion of the leading compartment, the terms trailing and leading being used with respect to the direction of rotation. The tube or the opening with which it communicates is provided with a one way valve which prevents high pressure gases from moving forwardly through the tube, but which allows liquid in an ascending compartment to drain back to a trailing compartment, desirably when the liquid level in the trailing compartment falls below the level of the opening.

The invention will be more fully described in connection with the accompanying drawings of an illustrative engine in which:

FIG. 1 is a side elevation in section showing an illustrative engine immersed in a bath of heated liquid:

FIG. 2 is an enlarged sectional view showing one of the interconnectors which join adjacent compartments; and FIG. 3 is an end view of the interconnector.

As can be seen in FIG. 1, the engine 10 is constituted by a train of tubular compartments 11 which circle around a supporting axle 12, the train of compartments being tied to the central axle by means of connecting bars 13 which are secured to the train in any desired fashion. The compartments 11 are joined to one another by means of interconnectors 14, adjacent compartments being sealed to the intervening, interconnector to prevent leakage of the low boiling fluid which is pictured as being present within some of the containers. In the illustrative engine, the connecting bars 13 are tied to opposed interconnectors 14 by means of ties 15, and the bars 13 extend through the axle 12 so that rotation of the circular train of interlinked compartments will serve to rotate the axle. Considerable power is obtained at low rotational speeds, and the use of appropriate gearing permits operation of an electrical generator. While only a single train is shown, many would likely be linked to a common axle in actual practice.

Each interconnector 14 separates a leading compartment from a trailing compartment and is formed with an opening 16. This opening 16 communicates with a forwardly extending tube 18 which extends into the central portion of the leading compartment. Either the tube or the opening is regulated by means of a one way valve 17 which allows rearward movement but prevents forward movement. Such valves are themselves well known. As a result, when pressure is developed within any compartment by the boiling of liquid within it, the liquid is pumped rearwardly through the tube, but the pressure is not transmitted forwardly. Also, as liquid is pumped into a trailing compartment, this compresses the gas within this compartment, but the pressure can escape to the next trailing compartment and this allows a compartment to be filled until the liquid covers the bottom of the tube which extends into it, whereupon further liquid pumped into the compartment starts to pump liquid into the next trailing compartment.

An important aspect of this invention is the fact that when the liquid level within a trailing compartment falls below the opening 16, the leading compartment which is beginning its ascent and which is still under pressure, provides a siphoning action which allows the residual liquid in the leading compartment to drain, and this can occur only if the compartment is configured to force the liquid toward the lower open end of the tube 18. It will be seen that drainage occurs before ascent is extensive and this minimizes drag on the system.

It is also possible to avoid the need for one way valves because the opening and closing functions take place at predetermined portions of the circular movement of the circular train, and it is therefore possible to have magnetically responsive slide valves and external magnets for actuation of these slides. However, one way valves are simpler and operate automatically.

The interconnector 14 will be better seen in FIGS. 2 and 3 where it will be seen that the interconnector is formed of molded plastic to include a body 20 formed with spaced shoulders 21 which engage the ties 15, and fittings 22 and 23 which extend from the body 20 to sealingly receive the tubular compartments 11. It will also be seen that the tube 18 extends through the opening 16 and the one way valve feature is here pictured by a float 24 within a cage 25, though the valve details can vary considerably as is well known. The one way valve is sometimes termed a check valve.

In addition to the fittings are obstructions 26 which fill up the trailing end of each of the compartments on the outside of the compartments. This forces the liquid in an ascending compartment toward the open end of tube 18 which helps to drain the compartment. The tube 18 is bent toward the outside of the compartment to be in position to receive the draining liquid. Of course, it there were a second opening in the body 20 with a second one way valve therein to provide drainage, this would not be effective since gas pressure then could not build up to enable the rearward transfer of liquid because this pressure would escape rearwardly after the lower end of tube 18 is covered with liquid.

The exact position of the lower open end of tube 18 can vary considerably and such variation is broadly covered by reference to the central portion of the leading compartment.

The operation of the engine will be evident from FIG. 1 where it will be seen that the liquid in the bottom compartment is heated by the hot water in the trough 27, and this liquid being low boiling (like freon or propane) has boiled to expel most of the liquid to the trailing compartment which is shown about half full. Some of the liquid has even been pushed into the previous compartment. Some liquid is also shown in the first ascending compartment draining back through opening 16 which minimizes drag on the system.

The one way valves effectively interconnect the descending compartments, and this allows the gas in these chambers to move away from the rising liquid and thereby minimize back pressure which assists in the desired transfer of liquid.

It will be seen that the generation of energy in the invention also serves to cool the heated liquid which powers the system, and this is of value in the handling of industrial wastes where heat pollution is a problem, as in fission power plants. In solar heating we associate power generation with the presence of sunshine, but regardless of the source of heat, the air is coolest at night, so even when the sun is relied upon to provide the heat, the system will continue to operate long after nightfall.

The invention is of particular value where the heated liquid is quiescent, as in a pool, so that convection can cause separation to bring the hotest liquid to the surface to power the engine of this invention, and the coolest liquid can be tapped off from the bottom of the pool.

To illustrate typical construction, the tubular compartments 11 would normally range from 2 inches to 10 inches in diameter and have a length of from 6 inches to 60 inches. A single valve 28 in one of the compartments can be used to charge the system with the low boiling liquid.

It will lastly be appreciated that if the compartments are short, that the extent to which the tubes extend into the leading compartment can be minimized, but the tube should still extend to a position near the outside of the compartment. Also, the shorter the compartment and the less the tube extends into the leading compartment, the less the need for obstructions to assist drainage. It is also desirable to employ compartments with narrow diameter necks to allow the use of simplified interconnectors, but these are details which do not alter the operation of the engine.

I claim:

1. An engine adapted to operate upon partial immersion in a heated liquid comprising, a circular train of tubular compartments sealed to interconnectors which join adjacent leading and trailing compartments, some of said compartments containing low boiling liquid for powering said engine and said circular train being tied to a central axle so that rotation of said train will rotate said axle, said interconnectors having an opening and a tube extending forwardly into the leading compartment, and valve means permitting rearward movement through said tube while preventing forward movement through said tube.

2. An engine as recited in claim 1 in which there is only a single opening in each interconnector and said tube extends into the central portion of the leading compartment.

3. An engine as recited in claim 1 in which tube extends to a position near the outside of said compartment to receive liquid draining therefrom when said compartment starts its ascent.

4. An engine as recited in claim 2 in which the trailing end of each compartment is obstructed near the outside of the compartment to direct liquid remaining in the compartment toward the open end of said tube which is positioned near the outside of said compartment to enable liquid to drain from said compartment when said compartment starts its ascent.

5. An engine as recited in claim 1 in which the valve means are constituted by one way valves associated with said tubes or openings.

6. A circular train of tubular compartments sealed to interconnectors which join adjacent leading and trailing compartments, said interconnectors joining said compartments and communicating with a tube extending forwardly into a leading compartment to terminate at a position near the outside thereof to receive liquid draining from said leading compartment when it starts an ascending movement, and one way valve means permiting forward movement through said tubes while preventing rearward movement through said tubes.

7. A circular train to compartments as recited in claim 6 in which obstructions are provided at the trailing ends of said compartments near the outside thereof to assist in the drainage of an ascending compartment.

* * * * *